United States Patent
Silverio et al.

(10) Patent No.: US 11,502,574 B2
(45) Date of Patent: Nov. 15, 2022

(54) PHASE TO PHASE TERMINAL LEAD PROTECTION

(71) Applicant: Hamilton Sundstrand Corporation, Charlotte, NC (US)

(72) Inventors: Yandriel Silverio, Rockford, IL (US); Joshua J. Krecklow, Leaf River, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 462 days.

(21) Appl. No.: 16/738,347

(22) Filed: Jan. 9, 2020

(65) Prior Publication Data
US 2021/0218311 A1 Jul. 15, 2021

(51) Int. Cl.
| | |
|---|---|
| *H01R 4/02* | (2006.01) |
| *H02K 5/22* | (2006.01) |
| *H01R 4/70* | (2006.01) |
| *H01R 9/24* | (2006.01) |
| *H01R 43/00* | (2006.01) |
| *H01R 43/02* | (2006.01) |
| *H01R 43/033* | (2006.01) |

(52) U.S. Cl.
CPC .............. *H02K 5/225* (2013.01); *H01R 4/02* (2013.01); *H01R 4/70* (2013.01); *H01R 9/24* (2013.01); *H01R 43/005* (2013.01); *H01R 43/02* (2013.01); *H01R 43/033* (2013.01); *H01R 2201/10* (2013.01)

(58) Field of Classification Search
CPC . H02K 5/225; H01R 4/02; H01R 4/70; H01R 9/24; H01R 43/005; H01R 43/02; H01R 43/033; H01R 2201/10
See application file for complete search history.

(56) References Cited

U.S. PATENT DOCUMENTS

| | | | |
|---|---|---|---|
| 1,975,244 A * | 10/1934 | Wiseman | H01R 13/28 403/339 |
| 3,038,093 A | 6/1962 | Needham et al. | |
| 4,160,926 A | 7/1979 | Cope et al. | |
| 4,468,083 A * | 8/1984 | Lee | H01R 4/20 439/825 |

(Continued)

FOREIGN PATENT DOCUMENTS

| | | | |
|---|---|---|---|
| EP | 1045504 B1 * | 12/2008 | H02K 3/12 |
| JP | S5286190 A | 7/1977 | |

(Continued)

OTHER PUBLICATIONS

Extended European Search Report dated May 29, 2021, issued during the prosecution of European Patent Application No. EP 21150610.0.

*Primary Examiner* — Tho D Ta
(74) *Attorney, Agent, or Firm* — Locke Lord LLP; Joshua L. Jones; Scott D. Wofsy

(57) ABSTRACT

A system includes a pair of terminal leads joined together. An insulative sleeve is wrapped around the pair of terminal leads. Lacing binds around the insulative sleeve. Cured epoxy can encase the insulative sleeve and lacing. The insulative sleeve can include fiberglass. The insulative sleeve can be wrapped more than 360° around the pair of terminal leads so that a first edge of the insulative sleeve is tucked under a second edge of the insulative sleeve.

10 Claims, 2 Drawing Sheets

(56) References Cited

U.S. PATENT DOCUMENTS

2015/0035396 A1    2/2015   Kinoshita

FOREIGN PATENT DOCUMENTS

| JP | S5357405 A   |   | 5/1978 |
| JP | 53093302 A   | * | 8/1978 |
| JP | 53101601 A   | * | 9/1978 |
| JP | 2004119171 A |   | 4/2004 |

* cited by examiner

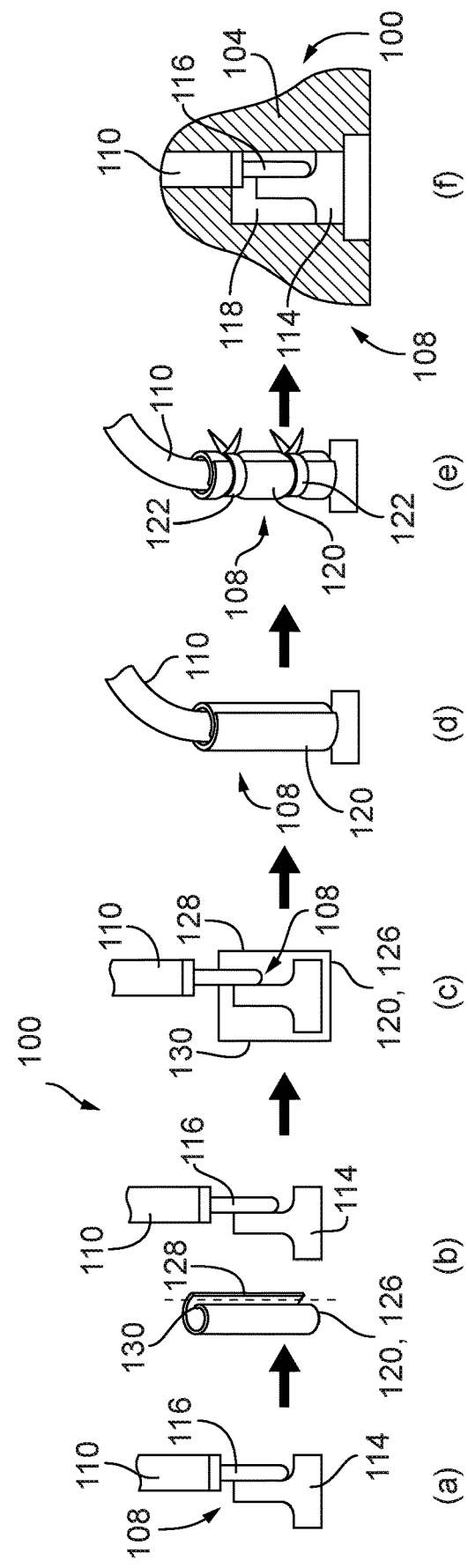
FIG. 2
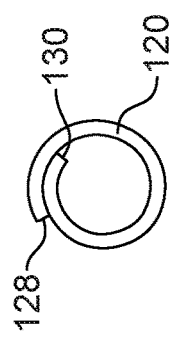
FIG. 4
FIG. 3

PHASE TO PHASE TERMINAL LEAD PROTECTION

BACKGROUND

1. Field

The present disclosure relates to electric machines, and more particularly to phase to phase terminal lead protection for electric machines.

2. Description of Related Art

Electric machines such as generators can have brazed terminal leads. In the event of FOD (foreign object debris) being introduced to the electric machine, it is sometimes possible for the FOD to short circuit the electric machine, e.g., if the FOD is metallic and contacts two of the terminal leads.

The conventional techniques have been considered satisfactory for their intended purpose. However, there is an ever present need for improved systems and methods for electric machines. This disclosure provides a solution for this need.

SUMMARY

A system includes a pair of terminal leads joined together. An insulative sleeve is wrapped around the pair of terminal leads. Lacing binds around the insulative sleeve.

Cured epoxy can encase the insulative sleeve and lacing. The insulative sleeve can include fiberglass. The insulative sleeve can be wrapped more than 360° around the pair of terminal leads so that a first edge of the insulative sleeve is tucked under a second edge of the insulative sleeve.

The pair of terminal leads can be brazed together. The terminal leads can be mounted to a terminal block. The pair of terminal leads can be a single pair of terminal leads. One or more additional pairs of terminal leads can be mounted to the terminal block, wherein each additional pair of terminal leads has a respective insulative sleeve wrapped around it. The terminal block can be mounted to an electric machine housing. The pair of terminal leads can be electrically connected to a stator of the electric machine.

A method includes brazing together a pair of terminal leads and wrapping the pair of terminal leads in an insulative sleeve after brazing. The method includes binding the insulative sleeve to the pair of terminal leads.

The method can include spreading epoxy over the sleeve and curing the epoxy. The method can include cutting a fiberglass sleeve into a sheet with opposed first and second edges for use as the insulative sleeve before wrapping the pair of terminal leads in the insulative sleeve. Wrapping the pair of terminal leads in the insulative sleeve can include wrapping the insulative sleeve more than 360° around the terminal leads so that the first edge of the insulative sleeve is tucked under the second edge of the insulative sleeve. The pair of terminal leads can be mounted to a terminal block and the method can include mounting the terminal block to an electric machine housing. The method can include electrically connecting the terminal leads to a stator in the electric machine housing. The method can include comprising wrapping at least one additional pair of terminal leads in a respective insulative sleeve.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic cross-sectional axial end view of a portion of the system of FIG. 1, showing the brazed pair of terminal leads;

FIG. 3 is a schematic view of the system of FIG. 1, showing a sequence in a process of making the system for protecting the brazed pairs of terminal leads; and FIG. 4 is a schematic plan view of a portion of the system of FIG. 1, showing the overlapping edges of the insulation sleeve.

DETAILED DESCRIPTION OF THE PREFERRED EMBODIMENTS

Figure 1:
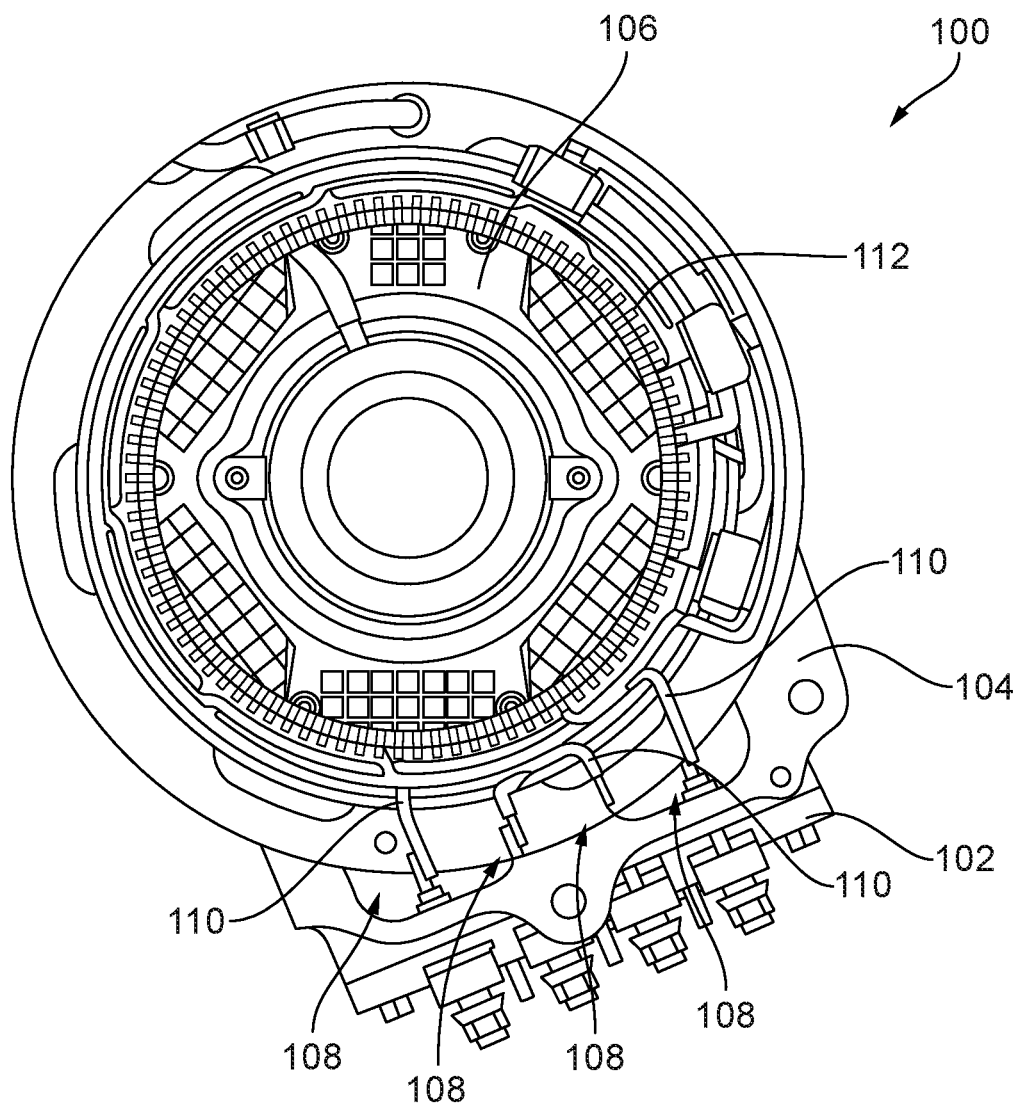
FIG. 1 is a schematic cross-sectional axial end view of an embodiment of a system constructed in accordance with the present disclosure, showing the terminal block mounted to the electric machine housing.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to isolate terminal leads in an electric machine from one another, improving robustness against FOD (foreign object debris) induced short circuits and the like.

System 100 includes a terminal block 102 mounted to an electric machine housing 104 of an electric machine 106, e.g., a generator for aerospace applications. Four pairs of terminal leads 108 are mounted to the terminal block 102. Those skilled in the art will readily appreciate that any suitable number of pairs of terminal leads 108 can be used without departing from the scope of this disclosure. A respective wire 110 electrically connects each pair of terminal leads 108 a stator 112 of the electric machine 106. Each pair of terminal leads 108 are joined together, e.g. the respective leads 114 and 116 in each pair of terminal leads 108 can be brazed together, as indicated in FIG. 3 and described more below.

With reference now to FIG. 2, there is a pocket 118 defined in the housing 104, where each pair 108 of the terminal leads 114, 116 are seated. An insulative sleeve 120 is wrapped around the pair of terminal leads 108. Two lacings 122 (but any suitable number can be used) bind around the insulative sleeve 120. The insulative sleeve 120 and lacings 122 can include fiberglass. Cured epoxy 124 can encase the insulative sleeve 120 and lacing 122 in the pocket 118.

With reference now to FIG. 3, a method is shown for making the system 100. At block a, the two terminal leads 114, 116 are brazed together as a pair. Then at block b, a fiberglass sleeve or tube is cut, e.g., along the dotted line, into a sheet 126 with opposed first and second edges 128, 130 for use as the insulative sleeve 120 as shown at block c. Then at block d, the pair of terminal leads 108 is wrapped in the insulative sleeve 120. Wrapping the pair of terminal leads 108 in the insulative sleeve 120 can include wrapping the insulative sleeve 120 more than 360° around the pair of terminal leads 108 so that the first edge 130 of the insulative sleeve 120 is tucked under the second edge 128 of the insulative sleeve 120, as shown in the top view of FIG. 4. At block e, the insulative sleeve is laced with lacings 122 to bind the insulative sleeve 120 in place around the pair of terminal leads 108.

The procedure to this point can be performed on all four (or any other suitable number) of the pairs of terminal leads 108 shown in FIG. 1, while the pairs of terminal leads 108 and corresponding wires 110 are mounted to the terminal block 102, but before the terminal block 102 is mounted to the housing 104. At block e, the method includes binding the insulative sleeve 120 to the pair of terminal leads with the lacings 122. After block e, the wires 110 can be threaded into the housing 104 shown in FIG. 1, and the terminal block 102 can be mounted to the housing 104. The method can include electrically connecting the terminal leads, using the wires 110, to a stator 112 in the electric machine housing 104. Block f in FIG. 3 shows that with the terminal block 102 mounted to the housing 104 as shown in FIG. 1, the pair of terminal leads 108 and the insulative sleeve 120 are seated in the pocket 118. As indicated in block f of FIG. 3, the method can include spreading epoxy 124 over the insulative sleeve 120 and curing the epoxy 124 to encase the insulative sleeve 120 around the pair of terminal leads 108 in the pocket 118.

The methods and systems of the present disclosure, as described above and shown in the drawings, provide for phase to phase terminal lead isolation and protection with superior performance relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a pair of terminal leads joined together;
an insulative sleeve wrapped around the pair of terminal leads; and
lacing binding around the insulative sleeve, wherein the pair of terminal leads are brazed together, wherein the terminal leads are mounted to a terminal block, wherein the pair of terminal leads is a first pair of terminal leads and further comprising at least one additional pair of terminal leads mounted to the terminal block, wherein each additional pair of terminal leads has a respective insulative sleeve wrapped therearound, wherein the terminal block is mounted to an electric machine housing.

2. The system as recited in claim 1, wherein the insulative sleeve includes fiberglass.

3. The system as recited in claim 1, wherein the pair of terminal leads is electrically connected to a stator of the electric machine.

4. The system as recited in claim 1, further comprising cured epoxy encasing the insulative sleeve and lacing.

5. The system as recited in claim 4, wherein the insulative sleeve is wrapped more than 360° around the pair of terminal leads so that a first edge of the insulative sleeve is tucked under a second edge of the insulative sleeve.

6. A method comprising:
brazing together a pair of terminal leads;
wrapping the pair of terminal leads in an insulative sleeve after brazing; and
binding the insulative sleeve to the pair of terminal leads, wherein the terminal leads are mounted to a terminal block, wherein the pair of terminal leads is a first pair of terminal leads and further comprising at least one additional pair of terminal leads mounted to the terminal block, wherein wrapping includes wrapping so each additional pair of terminal leads has a respective insulative sleeve wrapped therearound, wherein the terminal block is mounted to an electric machine housing .

7. The method as recited in claim 6, further comprising spreading epoxy over the sleeve and curing the epoxy.

8. The method as recited in claim 6, further comprising cutting a respective fiberglass sleeve into a sheet with opposed first and second edges for use as the insulative sleeve before wrapping each pair of terminal leads in the respective insulative sleeve.

9. The method as recited in claim 8, wherein wrapping the pair of terminal leads in the insulative sleeve includes wrapping the insulative sleeve more than 360° around the terminal leads so that the first edge of the insulative sleeve is tucked under the second edge of the insulative sleeve.

10. The method as recited in claim 7, further comprising electrically connecting the terminal leads to a stator in the electric machine housing.

* * * * *